United States Patent [19]
Moggi et al.

[11] Patent Number: 4,946,936
[45] Date of Patent: Aug. 7, 1990

[54] FLUORINATED POLYMERS AND COPOLYMERS CONTAINING PERFLUOROPOLYETHERS BLOCKS

[75] Inventors: Giovanni Moggi; Giuseppe Marchionni, both of Milan, Italy

[73] Assignee: Ausimont S.r.l., Milan, Italy

[21] Appl. No.: 281,536

[22] Filed: Dec. 8, 1988

[30] Foreign Application Priority Data

Dec. 10, 1987 [IT] Italy .................... 22929 A/87

[51] Int. Cl.$^5$ .................... C08G 67/02; C08G 61/00
[52] U.S. Cl. .................... 528/392; 525/185; 525/539; 528/397; 528/425
[58] Field of Search ................ 525/185, 539; 528/392, 528/397, 425

[56] References Cited

U.S. PATENT DOCUMENTS 4,330,654  5/1982  Ezzell et al. .................... 528/401
4,687,821  8/1987  Ezzell et al. .................... 528/401

Primary Examiner—Harold D. Anderson
Assistant Examiner—T. Mosley
Attorney, Agent, or Firm—Stevens, Davis, Miller & Mosher

[57] ABSTRACT

By means of radicalic starters, fluoroolefins are polymerized in the presence of perfluoropolyethers containing, at one or at both ends, a bromine atom, in such amounts that the weight ratio between the perfluoropolyethers and the fluorinated olefins in the resulting product ranges from 4/1 to 1/50. The bromine-containing perfluoropolyethers utilized in the process have a molecular weight from 400 to 10,000, and preferably from 600 to 8,000. The resulting polymeric products comprise sequences of perfluoroolefinic units and perfluoropolyether blocks.

3 Claims, No Drawings

FLUORINATED POLYMERS AND COPOLYMERS CONTAINING PERFLUOROPOLYETHERS BLOCKS

DESCRIPTION OF THE INVENTION

The present invention is based on a process for the radicalic polymerization of fluoroolefins, either alone or in admixture with non-fluorinated olefins. Therefore the process is carried out in the presence of perfluoropolyethers having end groups containing bromine atoms comprised in the following general formula:

$$A-(OCF_2-CF(CF_3))_m-(OCF(T))_n-(OCF_2CF_2)_q-O-B \qquad (I)$$

wherein: $T=F$ or $CF_3$; m, n, and q are integers, including zero, $m+n+q$ ranges from 2 to 100; A and B, either alike or different from each other, consist of one of the following groups:

$$-CF_2X; \ -CF_2-CF_2-X; \ -CF(CF_3)-X; \ -CF_2-CFX-CF_3;$$

$$-COF; \ -CF_2-COF; \ \text{and} \ CF(CF_3)-COF;$$

x being bromine or fluorine, provided that at least one end group contains Br.

Perfluorooxyalkylene units $$-OCF_2-CF(CF_3)-, \ -OCF(T)-,$$

$-OCF_2CF_2-$ are distributed at random along the perfluoropolyether chain.

The perfluoropolyethers having brominated end groups to be utilized in the present invention are liquid products having an average molecular weight ranging from 400 to 10,000, preferably from 600 to 8,000. They are obtainable according to the processes disclosed in European patent publication No. 195,946 and are obtainable as mixtures of products having different molecular weights, containing bromine at one end or at both ends.

Particularly suitable products are those having the following general formulae:

$$CF_3(OCF_2)_n(OCF_2CF_2)_qOCF_2CF_2Br \qquad (II)$$

$$BrCF_2(OCF_2)_n(OCF_2CF_2)_qOCF_2CF_2Br \qquad (III)$$

$$CF_3(OCF_2-CF(CF_3))_m(OCF(T))_nOCF(T)-Br \qquad (IV)$$

where $T=F$ or $CF_3$, and m, n and q are as defined above.

For convenience of representation, the brominated perfluoropolyethers of class (II) will be indicated hereinafter by $R_fBr$, those of class (III) by $BrR'_fBr$, and those of class (IV) by $R''_fBr$.

According to the present invention, the perfluoropolyethers, as they act as chain transfer agents in the radicalic polymerization process of fluoroolefins, give rise to the formation of new polymeric products containing one or more blocks having a perfluoropolyether structure and bound to sequences of perfluoroolefinic units.

This particular structure of the polymeric or oligomeric products according to the present invention imparts to them a complex of specific properties which are of great interest in the field of fluorinated polymers.

According to known processes, the fluorinated telomers and polymers are generally prepared from the corresponding monomers by radicalic polymerization in the presence of a starter, operating in an aqueous emulsion, in bulk, or in the presence of a solvent capable of acting as a chain transfer agent or as a telogen agent for molecular weight regulation and control of product homogeneity (molecular weight distribution).

The molecular weight modified according to the art are generally not capable of modifying, particularly in the case of high molecular weight polymers, specific properties of practical significance exhibited by the fluorinated polymer, such as the glass transition temperature, the compatibility with fluorinated fluids, and the processability, for fluoroelastomers. That is due to the fact that the end groups of the polymeric chains, derived from the chain transfer mechanism of the molecular weight regulation, have a negligible mass in comparison with that of the polymeric chain and, therefore, cannot significatively influence the properties of the latter, in the sense of imparting to the obtained polymer the specific characteristics which are typical of the compound utilized as a chain transferor.

Among the fluorinated olefins which are utilizable in the present invention, particularly suited are the following: vinylidene fluoride (VDF), tetrafluoroethylene (TFE), VDF/hexafluoropropene (PFP) mixtures, VDF/PFP/TFE mixtures, VDF/TFE mixtures, $C_2H_4$/TFE mixtures, and $C_3G_6$/TFE mixtures. The fluoroolefin mixtures may furthermore contain perfluoroalkyl-vinylethers such as perfluoromethylvinylether, 2-bromotetrafluoroethyl-trifluoromethylvinylether, hexafluorobutadiene, and $CF_2=CFCl$.

By indicating the fluoroolefinic unit or units of the polymeric chain with "P", the polymers of the present invention may be indicated by the following formula:

$$R_f-(P)_r-BF \ \text{or} \ R''_f-(P)_r-Br \qquad (V)$$

$$Br(P)_r-R'_f-(P)_rBr \qquad (VI)$$

where r indicates the total number of monomeric units derived from a fluoroolefin or from more than one fluoroolefin, r ranging from 5 to 5,000, and preferably from 10 to 1,000.

The weight ratio between the perfluoropolyether chain $R_f$ or $R'_f$ or $R''_f$ and the fluoroolefinic chain $(P)_r$ ranges from 4/1 to 1/50, and preferably from 1/1 to 1/20.

The polymers of general formulae V and VI may be prepared by usual polyaddition polymerization techniques, in the presence of a radicalic starter, for example by operating in a solution. Preferred solvents are chlorofluorohydrocarbons, in particular trifluorotrichloroethane (FC 113); or by operating in an aqueous emulsion in the presence of a preferably fluorinated surfactant, such as ammonium perfluorooctanoate.

As a starter it is preferable to use, when operating in a solvent, an organic peroxide such as those utilized in the radicalic polymerization technique. The polyaddition reaction temperature generally ranges from 30° to 130° C., depending on the type of the starter. In an aqueous emulsion it is possible to use a persulphate alone or in redox systems, at temperatures from 10° to 95° C.

With monomers which are gaseous at the reaction temperature, one operates at a pressure suitable for obtaining a monomer concentration which is sufficient for a satisfactory reaction rate.

When the polymerization process is conducted in more than one step, it is possible to obtain block copolymers characterized by an alternation of perfluoropolyether chains and chains of olefinic units.

By the present invention it is possible to obtain modifications and in the macromolecular structures of known types of polymers and advantageously vary the properties thereof, as the polymers and telomers so obtained exhibit, in one and the same macromolecule, sequences having a perfluoropolyether structure and sequences having repeating (fluoro)olefinic units; for example:

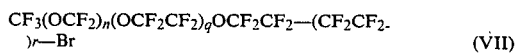
(VII)

This type of polymer may be obtained starting from a brominated perfluoropolyether having formula II.

The structure of formula VII was revealed by NMR analysis carried out in the solid state.

When a mixture of VDF and PFP and a perfluoropolyether of formula II are used in the polymerization, it is possible to obtain a product having elastomeric characteristics, of the general formula:

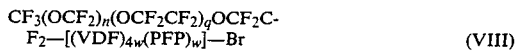
(VIII)

where units VDF and PFP are distributed at random in the fluoroolefinic chain, with the exception of sequence —PFP—PFP—, and w ranges from 2 to 1,000.

The NMR analysis of this product permits a qualitative and quantitative recognition of their microstructure by determining the values of n, q, and w as well as the number average molecular weight from an evaluation of the end groups.

The oligomer and polymer products according to the present invention may be advantageously utilized as additives in fluoroelastomeric compositions based on conventional fluoroelastomers to improve certain properties thereof.

From European patent application No. 222,201 it is known that brominated perfluoropolyethers of general formula I can be mixed, in vulcanizable fluoroelastomeric compositions, with peroxides; the mixture is then co-vulcanized at 160°–180° C. in a mold. A better processability of the mix and an easier withdrawing of the vulcanizate from the mold are thereby obtained. This technique, however, since the bond between brominated perfluoropolyether and fluoroelastomeric chain forms during the vulcanization step at a high temperature (150°–180° C.), involves the risk of losing brominated perfluoropolyether due to volatilization before it can co-vulcanize with the fluoroelastomer. Consequently, brominated perfluoropolyethers having a high molecular weight of at least 1,200 should preferably be used for said application.

The present invention permits one to utilize, as a starting material, a low molecular weight brominated PFPE because, due to the addition of fluoroolefins, it is possible to obtain a product having a very low volatility and a high thermal stability comparable with or higher than those of the basic fluoroelastomer.

The products obtained according to the present invention, when used as additives for fluoroelastomers conforming to the abovesaid application, are utilized in an amount ranging from 0.1 to 10 parts by weight to 100 parts by weight of fluoroelastomer, and preferably from 1 to 8 parts by weight.

The polymeric or oligomeric products prepared according to the present invention exhibit two glass transition temperatures (Tg), one of which is below −100° C. and is due to the perfluoropolyether block, while the other, having a higher value, is due to the sequence of fluoroolefinic units: in the case of a sequence VDF, PFP with a VDF/PFP molar ratio of 4/1, said temperature is about −24° C.

The following examples are give merely to illustrate but not to limit the present invention.

EXAMPLE 1

Into a 300 ml autoclave there were charged 28 ml of tricholorotrifluoroethane (FC 113), 10 g of brominated perfluoropolyether of formula II ($R_fBr$) with a q/n ratio of about 5 and with an average molecular weight of 1,200, and furthermore 0.7 g of di-t.butylperoxide (DTBP) and 10 g of vinylidene fluoride; the whole was then heated to 130° C. A maximum pressure of 20 atmospheres was reached, which subsequently decreased. The test was stopped after 50 minutes, the autoclave was vented to atmospheric pressure and a suspension of polymer in the solvent was obtained. After filtration, the polymer was washed with FC 113 to remove unreacted $R_fBr$, if any; then it was dried and analyzed.

The differential thermal analysis (DSC) revealed the presence of a glass transition at −140° C. due to the group $R_f$, and another glass transition at −50° C., due to the sequences VDF, and a melting point at 161° C. always due to the sequences VDF.

The NMR analysis carried out on a mixture of DMF (4 parts) and FC 113 (1 part) permitted one to attribute the following structural formula thereto:

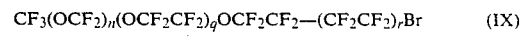
(IX)

where r=15 and where q and n correspond to the values of the starting perfluoropolyether.

The weight ratio between the perfluoropolyether block $R_f$ and the chain —(CH$_2$CF$_2$)$_r$ was about 1.2/1.

EXAMPLE 2

Operating as in Example 1 but using as a solvent a mixture of perfluoroalkanes having a boiling point of about 80° C. and 5 g of a brominated perfluoropolyether of general formula II with an n/q ratio equal to 1/10 and an average molecular weight of 3,200, 0.40 g of DTBP, and 5 g of CH$_2$=CF$_2$.

The polymer was washed with solvent FC 113, dried and analyzed.

The differential thermal analysis revealed also in this case the presence of a glass transition at −114° C. due to the group $R_f$, a glass transition at −49° C. due to a sequence of units VDF, and a melting point at 161° C. also due to repeating units VDF and corresponding to that of polyvinylidene fluoride.

The formula was the following:

$$CF_3(OCF_2)_n(OCF_2CF_2)_qOCF_2CF_2-(CH_2CF_2)_r-Br \quad (X)$$

where $r = 25$ and where q and n correspond to the value so the starting perfluoropolyether.

EXAMPLE 3 (Comparative Test)

Operating as in Example 1, but without perfluoropolyether $R_fBr$, there was obtained a polymer, which, subjected to $^{19}F$ NMR analysis and to differential thermal analysis (DSC), exhibited the characteristics of polyvinylidene fluoride with a melting point of 161° C. and only one glass transition temperature (Tg) at −49° C.

The absence of a Tg at about −140° C. proves that this Tg is due —as is described above in Examples 1 and 2 —to the $R_f$ group, which is absent in the present case.

EXAMPLE 4

Operating as in Example 1, but in a 3 liter autoclave, the monomer mixture consisted of 100 g of VDF and of 120 g of PFP. It was heated to 50° C. in the presence of 3 g of Perkadox 16 ®, corresponding to di-(4-ter.butylcyclohexyl)peroxycarbonate, as a radicalic starter, 500 ml of FC 113, and 55 g of fluoropolyether of formula III, having a molecular weight equal to 800 and a q/n ratio of about 4.

The resulting copolymer, having an elastomeric consistency, was isolated by evaporation of the residual solvent and was then washed with FC 113 and with hexane.

The differential thermal analysis revealed a lass transition at −142° C. and another glass transition at −25° C. due, respectively, to the group $R_f$ and to the sequence VDF/PFP, which were in a molar ratio ranging approximately from 4 to 1.

The $^{19}F$ NMR analysis confirmed the following structure:

$$Br(VDF,PFP)_{r'}[-CF_2(OCF_2CF_2)_n(OCF_2)_qOCF_2CF_2]-(VDF,PFP)_r-Br \quad (XI)$$

where $r + r' = 70$, the VDF/PFP molar ratio is equal to 4/1, and n and q have the values of the starting perfluoropolyether.

The weight ratio between the perfluoropolyether block and the sum of units VDF + PFP is about 1/8.2.

EXAMPLE 5

(Preparation of Modified PTFE)

Into a 3 liter autoclave equipped with a stirrer there were charged 500 ml of 1,1,2-trichlorotrifluoroethane (FC 113), 75 g of a brominated PFPE of general formula (II) with a n/q ratio = 1/3 and with a number average molecular weight equal to 660, determined by $^{19}F$ NMR analysis. After addition of 3.5 g of di-tert-.butylperoxide (DTBP) and 100 g of tetrafluoroethylene, the whole was heated to 130° C. A minimum pressure of 20 atm. was reached. After 30 minutes, stirring was stopped and the autoclave was cooled. The product was filtered, washed with FC 113 and dried. The product was in the form of a very fine white powder.

The product was subjected to $^{19}F$ NMR analysis (solid state), which revealed a structure represented by the following formula:

$$CF_3(OCF_2)_n(OCF_2CF_2)_qOCF_2CF_2\{CF_2CF_2\}_r-Br$$

having an n/q ratio equal to 1/3; units $\{CF_2CF_2\}_r$ represent in total 90% by weight of the product (r = about 50).

Tg was −148° C. due to the $R_f$ moiety; no Tg due to crystalline units $(CF_2CF_2)_r$ was observed. The melting points were 316° C. (first melting) and 300° C. (crystallization), which are typical of a low molecular weight PTFE.

EXAMPLE 6

Operating as in Example 4, and using 110 g of a monomer mixture consisting of 35% by moles of PFP and 65% of VDF (operating at 120° in the presence of di-t.butyl-peroxide as a radicalic starter) and of 27 g of perfluoropolyether of general formula II with a q/n ratio of about 4 and a molecular weight of about 800.

The copolymer, having the appearance of an elastomer exhibited a Tg of about −140° C. due to the perfluoropolyether sequences, and another Tg at −26° C. due to the VDF-PFP sequences in a molar ratio equal to 4/1.

The copolymer having an elastomeric appearance exhibited the following structure revealed by NMR analysis of $^{19}F$:

$$CF_3(OCF_2)_n(OCF_2CF_2)_qOCF_2CF_2-[(VDF,PFP)_r]-Br$$

with a q/n ratio of about 4, r = about 9, the VDF/PFP molar ratio being equal to 4/1.

Indicating the formula more simply:

$$R'_f-(VDF)_{4r}(PFP)_r Br,$$

the weight ratio between $R'_f$ and the remaining macromolecule was equal to about 1:1, which means that the macromolecule contained about 50% by weight of a perfluoropolyether structure.

EXAMPLES 7–12

The following examples show the use of the products prepared according to this invention, as additives for fluoroelastomeric compositions vulcanizable with peroxides, in order to improve some properties thereof.

By conventional mixing techniques there were prepared rubber mixes comprising the ingredients indicated in Table 1. Using the mixes so prepared, the tests and determinations indicated in the table were carried out.

Ingredients used in the Mixes

Elastomer 1: $CH_2=CF_2/C_3F_6/C_2F_4$ terpolymer in a 2/1/1/molar ratio, containing as a cure site, a brominated olefin, having a Mooney viscosity ML(1+4) at 100° C. equal to 104 and a total bromine content of 0.36% by weight (VITON ® GF).

Luperco ® 101 XL: 2,5-dimethyl-2,5,-di-(ter.1-butylperoxy)-hexane: product at 45% by weight with 55% of an inert filler.

TAIC: triallylisocyanurate.

Black MT: carbon black for rubbers (ASTM N 990).

Product 1: the compound prepared as is described in Example 4.

Product 2: the compound prepared as is described in Example 6.

Additive 1: brominated perfluoropolyether with a molecular weight equal to 800, as defined in Example 6.

Reference Example 7 reports the results obtained from a mix prepared and vulcanized according to the art with the peroxidic system, and a comparison is made with Examples 8, 9 and 10, which contain product 1 and product 2 according to this invention.

Improvements are obtained as regards the processability, which result in a decrease of the Mooney viscosity of the mixes, in the vulcanization rate characterized by lower $ts_{50}$ values, without jeopardizing the maximum cross-linking yield (max. torque), in the extrudability test, and in detachability from the molds. In the case of product 2, an improvement in the cold properties is also obtained.

Reference Example 11 reports the results obtained by using only the brominated perfluoropolyether utilized as an ingredient to prepare product 2 (see Example 6) according to the known technique described in European patent EP No. 222,201. In this case, the volatility due to the low molecular weight leads to the generation of smokes in the molding step and in the postvulcanization step in an oven.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

where r indicates the total number of monomeric units P deriving from one or more (fluoro)olefines and ranging from 5 to 5,000, and where $R_f$, $R'_f$ and $R''_f$ are perfluoropolyether blocks respectively of the formulae:

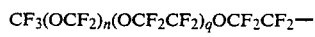

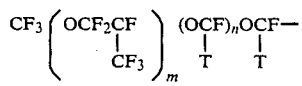

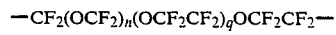

where T is F or $CF_3$, m, n and q are integers, zero included and are such that n+q and M+N have a value of at least 2 and at the maximum of 100, the perfluorooxyalkylene units being distributed at random along the perfluoropolyether chain.

2. A process for preparing the polymeric products of claim 1, which comprises polymerizing one or more fluoroolefins, or mixtures of fluoroolefins with non-

TABLE 2

| EXAMPLE | | 7 | 8 | 9 | 10 | 11 |
|---|---|---|---|---|---|---|
| ELASTOMER 1 (GF) | parts by w. | 100 | 100 | 100 | 100 | 100 |
| PRODUCT 1 | " | — | 3 | 5 | — | — |
| PRODUCT 2 | " | — | — | — | 6 | — |
| LUPERCO XL 10 | " | 3 | 3 | 3 | 3 | 3 |
| TAIC | " | 3.5 | 3.5 | 3.5 | 3.5 | 3.5 |
| PbO | " | 3 | 3 | 3 | 3 | 3 |
| BLACK MT | " | 30 | 30 | 30 | 30 | 30 |
| ADDITIVE 1 | " | — | — | — | — | — |
| THERMOMECHANICAL CHARACTERISTICS | | | | | | |
| ODR at 180° C.(1) | | | | | | |
| Min. torque (inch/lbs.) | | 23.2 | 20 | 18 | 18.5 | 20 |
| ts 10 (sec.) | | 79 | 78 | 80 | 81 | 80 |
| ts 50 (sec.) | | 114 | 109 | 110 | 106 | 120 |
| Max.torque (inch/lbs.) | | 115 | 109 | 108 | 99 | 96 |
| MOONEY VISCOSITY OF MIX (2) | | | | | | |
| —ML 1 + 10 (121 ° C) | | 104 | 86 | 76 | 83 | 91 |
| VULCANIZATION | | | | | | |
| in press 170 ° C. × 10 minutes | | | | | | |
| in oven 250 ° C. × 10 hours | | | | | | |
| Modulus at 100% (Mpa) (3) | | 6.6 | 5.9 | 5.4 | 5.6 | 4.9 |
| Tensile strength (Mpa) (3) | | 20.1 | 18.6 | 18 | 18.9 | 17 |
| Elongation at break (%) (3) | | 216 | 240 | 230 | 235 | 218 |
| IRHD hardness (4) | | 75 | 73 | 70 | 72 | 73 |
| | | | | | | (Shore A) |
| VULCANIZATE | | | | | | |
| Processability (5) | | | | | | |
| Rate (a) (g/min.) | | 30 | 36 | 41 | 42 | 40 |
| Garvey rating (b) | | 6 | 8 | 9 | 9 | 8 |
| CHARACTERISTICS AT LOW TEMPERATURE | | | | | | |
| Brittle point (°C.) (6) | | −35/−40 | −37/−42 | −40/−45 | −38/−43 | −35/−40 |

(1) according to ASTM D−2084
(2) according to ASTM D−1646
(3) according to ASTM D−412
(4) according to ASTM D−1415 on 6 mm thick specimens
(5) according to ASTM D−2230−78 (a) Method B. (b) Method A System B
(6) according to ASTM D−746

What is claimed is:

1. Polymeric product containing a perfluoropolyether sequence and sequences of fluoroolefinic units or of mixed fluoroolefinic and olefinic units, said product being represented by one of the formulae: halogenated olefins, in an inert fluorohydrocarbon or chlorofluorohydrocarbon solvent, in the presence of radical starter and of a perfluoropolyether of the formula:

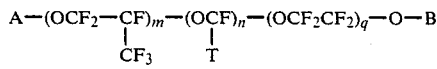

in which: T is F or $CF_3$; m, n and q are integers, zero included, m+n+q ranges from 2 to 100, A and B, alike or different from each other, consist of a group selected from the class consisting of:

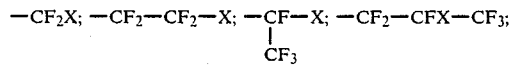

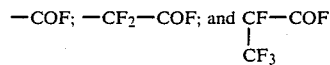

X being bromine or fluorine, provided that at least one end group contains Br.

3. A process for vulcanizing fluoroelastomers by a peroxide vulcanization in which process use is made of a processing aid consisting of a perfluoropolyether sequence of fluoroolefinic units or of mixed fluoroolefinic and olefinic units, said product being represented by one of the following formulae:

$$R_f(P)_r-Br \quad (1)$$

$$R''_f-(P)_r-Br; \text{ and} \quad (2)$$

$$Br-(P)_r R'_f(P)_r-Br \quad (3)$$

where r indicates the total number of monomeric units P deriving from one or more (fluoro)olefines and ranging from 5 to 5,000, and where $R_f$, $R'_f$ and $R''_f$ are perfluoropolyether blocks respectively of the formulae;

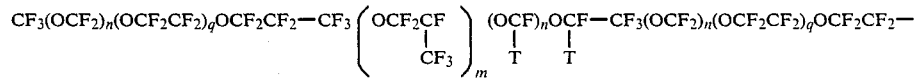

where T is F or $CF_3$, m, n and q are integers, zero included and are such that n+q and m+n have a value of at least 2 and at the maximum of 100, the perfluorooxyalkylene units being distributed at random along the perfluoropolyether chain in amounts 0.1–10 parts by weight for 100 parts by weight of fluoroelastomer.

* * * * *